Patented Jan. 9, 1934

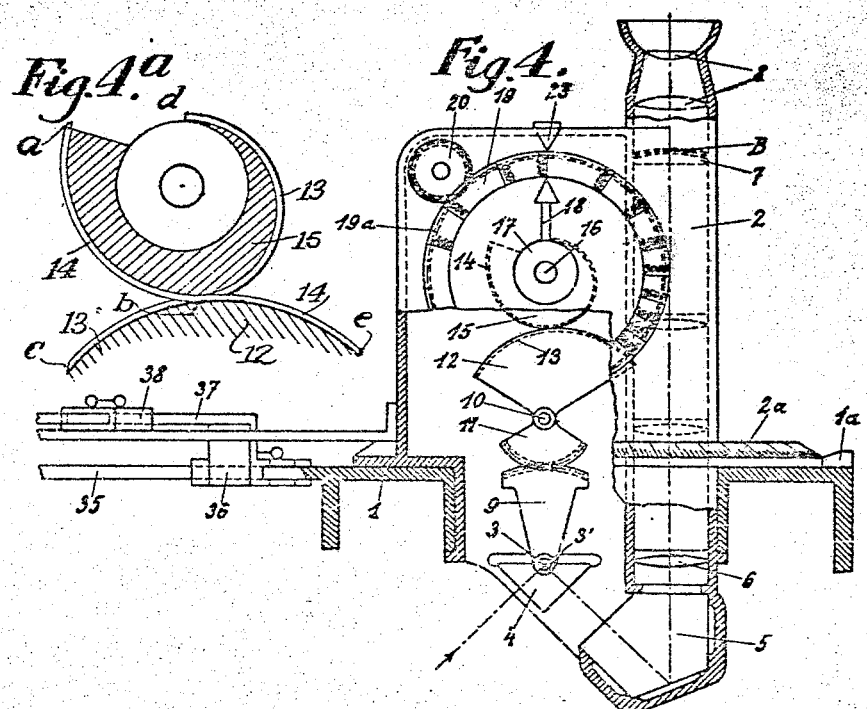
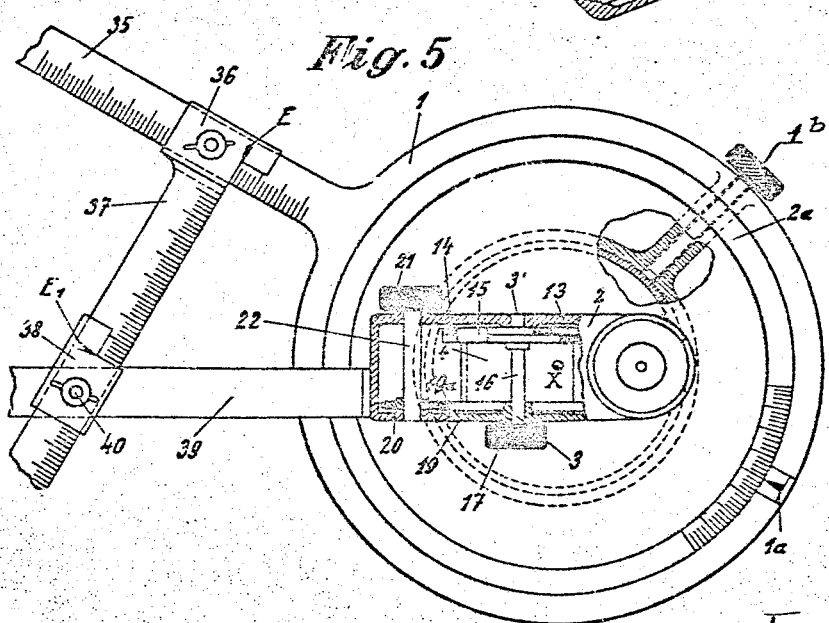

1,942,536

UNITED STATES PATENT OFFICE 1,942,536

APPARATUS FOR DETERMINING THE SPEED AND DIRECTION OF MOVEMENT OF AIRCRAFT AND OF MOVING TARGETS

Antonio Clementi, Vienna, Austria, assignor to Actiengeselischaft C. P. Goerz Optische Anstalt Actiova spolecnost K. P. Goerz opticky ustav, Pressburg, Bratislava, Czechoslovakia Application July 29, 1930, Serial No. 471,521, and in Germany August 10, 1929

1 Claim. (Cl. 88—1)

The present invention relates to an apparatus which on the one hand permits of rapidly and mechanically determining the speed and direction of movement of aircrafts necessary for manoeuvring as well as the speed and direction of movement of the wind, by which the two quantities are influenced; and on the other hand permits of determining the angle of allowance for the movement of the target for launching torpedoes or other missiles against a moving target.

The apparatus embodying my invention comprises a sighting device which for a given height of the aircraft above the ground or the surface of the sea permits of determining the horizontal distance and the horizontal angle of the axis of the aircraft relative to a stationary auxiliary target on the ground or the surface of the sea or a movable target at the beginning and at the end of a definite measuring period, and further comprises a double triangle solving device, the elements of which are provided with divisions of lengths and angles, and are adjusted in accordance with the data given by the sighting device, and permit in turn the direct reading of the speed and direction of movement to be determined.

Since in aircrafts, more particularly in small aircrafts, it is impossible to mount a horizontal range finder of the usual construction, a panorama telescope is used according to the present invention for determining the horizontal distance of the auxiliary target, which is adapted to rotate around a vertical axis and is provided at its bottom end with an entering reflector adapted to turn about a horizontal axis. For measuring the vertical angle of the sight line to the target, a water level located in the focus of the objective or in that of the eye piece or a freely suspended sighting hair cross is mounted in the lower part of the said telescope. For logarithmically multiplying the trigonometrical tangent of this angle with the height of the aircraft above the auxiliary target, the arrangement is such that on the one hand the rotation of the entering reflector is transmitted to a pair of coupled cams by a toothed gearing with a leverage ratio of 2 to 1. The rotation of one of the said cams, which is provided with a handle and a reading pointer, corresponds to the log tan of the angle of rotation of the other cam. On the other hand a circular scale concentric to the first cam and also rotatable by a handle, preferably through the medium of a toothed gearing, carries a logarithmic scale of heights.

Figure 1:
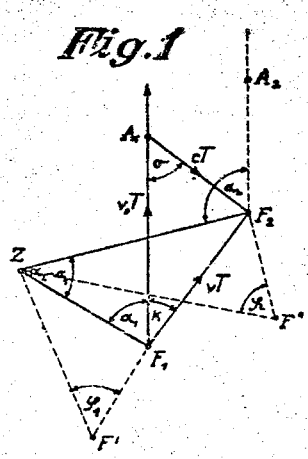
Figure 2:
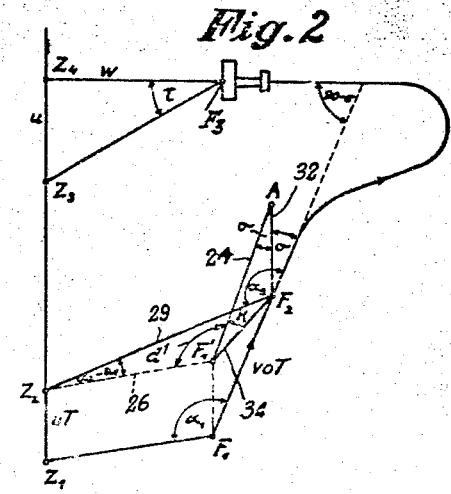
Figure 3:
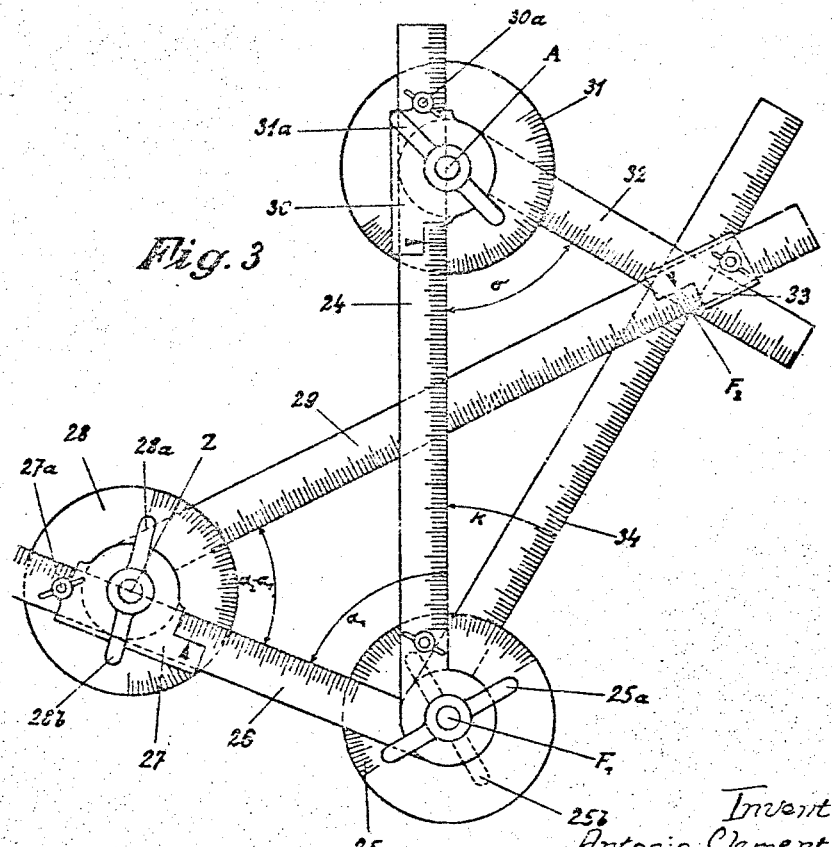

An embodiment of the invention is shown by way of example in the annexed drawings. Fig. 1 illustrates the geometrical basis of determining the direction and speed of the aircraft and of the wind. Fig. 2 illustrates the geometrical basis of determining the speed and direction of movements of a target moving in a straight horizontal line with uniform speed, for finding the quantities required for launching a missile against the said target. Fig. 3 is a plan view of a double triangle solving device, Fig. 4 is a side elevation, partly in section, of the optical sighting apparatus for determining the direction and distance of a target from the aircraft flying at a known height above the same. Fig. 4a shows a somewhat exaggerated detail of Fig. 4. Fig. 5 is a plan view partly in section of the sighting device with an apparatus for determining the angle required as allowance for the movement of the target in launching missiles against the same.

Referring now to Fig. 1, let $F_1$ be the horizontal projection of the aircraft at the beginning, and $F_2$ the same projection at the end of the measuring period and $F_1 A_1$ and $F_2 A_2$ the horizontal projection of the longitudinal axis of the aircraft, while $F_1 F_2$ is the direction of flight, and is inclined to the axis of the aircraft at an angle $K$ due to the lateral wind. $Z$ is a stationary auxiliary target on the ground or the sea which is called herein an auxiliary target, not because it is a second target used in the present method, but because the aircraft does not fly towards the same. This so called auxiliary target remains stationary at the side. Assuming now that the two triangles defined by the aircraft, its horizontal projection, and the auxiliary target $F'F_1 Z$ and $F''F_2 Z$ are turned down into the horizontal plane, then the horizontal distances of the auxiliary target at the beginning and at the end of the measuring period are found from $F_1 Z = F'F_1 \tan \varphi_1 = h \tan \varphi_1$ and
$$F_2 Z = F''F_2 \tan \varphi_2 = h \tan \varphi_2$$

wherein $\varphi_1$ and $\varphi_2$ are the angles that the lines connecting the aircraft and the auxiliary target make with the vertical, $h$, which equals $F_1 F' = F_2 F''$, being the constant linear height of the aircraft above the level of the target A, the aircraft being assumed to fly in a horizontal plane. Furthermore the azimuths of the auxiliary target relatively to the axes $F_1 A_1$ and $F_2 A_2$ of the aircraft are $\alpha_1$ and $\alpha_2$ respectively. If as is preferred the measuring period is $T=100$ seconds and if on the axis of the aircraft the distance $F_1A_1$ through which the air craft flies in 100 seconds in the absence of wind should be taken as 100 times the speed of the aircraft, then the distance $A_1F_2=cT$ is the distance through which the wind moves in the measuring period T that is, 100 times the speed of the wind c, and the angle $\sigma=F_1A_1F_2$ is the lateral angle of the wind relative to the axis of the aircraft, while the distance $F_1F_2=vT$ is 100 times the actual speed of flight of the air craft.

The elements $v$, $K$, $c$, $\sigma$, K being as above the angle between the direction of flight and the axis of the aircraft indispensable for the manoeuvre of the aircraft, may be determined by the double triangle solving device shown in Fig. 3 without the necessity of any calculation, provided that the horizontal distances $F_1Z$ and $F_2Z$ are known, as well as azimuths $\alpha_1$ and $\alpha_2$ of the auxiliary target at the beginning and at the end of the measuring period. This double triangle solving device consists in part of a rule 24 representing the longitudinal axis of the aircraft and provided with a longitudinal scale representing the speed of the aircraft. To this rule is secured a journal pin $F_1$, representing the horizontal projection of the aircraft, and an angle scale 25 for the horizontal angles. A rule 26 provided with a longitudinal scale for the horizontal distances is pivoted on the journal pin $F_1$ and may be locked in any position to which it is adjusted by a thumb nut 25a. The rules 26 and 24 carry slides 27 and 30 respectively provided with an adjusting mark. These slides may be locked in any position to which they are adjusted by set screws 27a and 30a, respectively. To each of the two slides angle scales 28 and 31 and journal pins Z and A are respectively secured. On these journal pins rules 29 and 32 are respectively pivoted, these rules being provided with longitudinal scales and adapted to be clamped against the angle scales above them by a thumb nut 28a and 31a respectively. The rule 29, provided with a longitudinal scale for horizontal distances, carries a slide 33 provided with an adjusting mark $F_2$ and means for clamping the same in position. On the pin $F_1$ a further rule 34 is pivoted which is provided with a speed scale similar to that of the rule 32, and is adapted to be adjusted relative to the angle scale 25 independently of the rule 26 and to be clamped in position by a thumb screw 25b below the same.

This device is used as follows: The slide 30 is adjusted on the rule 24 to indicate the speed of the aircraft and is there locked in position. Then the rule 26, the division edge of which passes through the centres of the journal pins $F_1$ and Z, is adjusted to the angle $\alpha_1$ on the angle scale 25 and is locked in position. Next the slide 27 is adjusted to the horizontal distance $F_1Z$ and is locked in position, and the rule 29, the division edge of which passes through the centre of the journal pin Z, is adjusted on the scale 28 to the difference of the two horizontal angles $\alpha_2-\alpha_1$ and is locked in this position.

Thereafter the slide 33 is adjusted to the measured horizontal distance $ZF_2$, and then the division edge of the rule 34, as well as of the rule 32, may be placed on the marked point $F_2$, whereby on the one hand the actual speed $v$ of the air craft may be read on the rule 34 and the speed of the wind on the rule 32, at the same time the angles K and $\sigma$ are obtained.

In order to determine the horizontal distances $F_1Z$ and $F_2Z$ as well as the horizontal angles of the auxiliary target relative to the axis of the air craft, the height $h$ of the latter above the level of the auxiliary target being known, a sighting device would be desirable, which indicates, in general, the horizontal distance F Z as the product of the said height and the trigonometric tangent of the angle $\phi$ of the line of sight from the aircraft to the auxiliary target relative to the vertical by sighting this target, the multiplication being effected logarithmically as in the case of an ordinary calculating rule. This apparatus consists, as shown in Figs. 4 and 5, of a telescope casing 2 rotatable around a vertical axis X on a base plate 1 maintained horizontal. The telescope casing is provided with a horizontal angle scale 2a serving for reading the horizontal angles $\alpha_1$, $\alpha_2$ of the auxiliary target sighted by means of a pointer 1a provided on the base plate. In this telescope casing the entering reflector 4 is rotatably mounted by means of horizontal trunnions 3—3', which reflector reflects the pencils of light coming obliquely from below into the pentaprism 5 which deflects the rays of light vertically upward through the objective 6. The image of the target thus appears in the focal plane B of the objective 6. For enabling the axis of the objective to be maintained in the vertical a focus water level is mounted in the focal plane B and serves at the same time as the collective lens. 8 is the eye piece. Secured to the frame of the entering reflector is a spur wheel segment 9 meshing with another spur wheel segment 11 on a shaft 10 parallel to the trunnions 3—3'. The leverage ratio between the segments 9 and 11 is 2:1. Fast with the segment 11 is a cam 12 coupled in well known manner with another cam 15 by two very thin steel strips 13, 14 located side by side and each wound round part of the periphery of each cam, the two strips being wound in opposite directions. This well known arrangement is shown in detail and somewhat exaggerated in Fig. 4a; the steel strip 14 runs from the point $a$ of cam 15 along its periphery to the point of contact $b$ of the cams 15 and 12 and thence along the periphery of the cam 12 to the point $e$ thereof, the steel strip 13 runs from the point $d$ of cam 15 along its periphery to the point of contact $b$ of the cams 15 and 12 and thence along the periphery of the cam 12 to the point $c$ thereof. Thus the steel strips 13, 14 being kept tight, whenever the cam 12 is turned in one direction, say clockwise, the cam 15 is turned in the opposite direction, namely anticlockwise, and vice versa. The circumferential speeds of the two cams at their point of contact $b$ are of course equal. The cam 15, the angle of rotation of which corresponds to the logarithm of the tangent of the angle of rotation of the other cam 12, is fast on a shaft 16 parallel to the shaft 10 and journalled in the telescope casing. The shaft 16 may be rotated by a handle 17 to which is secured the pointer 18. Loosely mounted on the shaft 16 is a circular scale 19 toothed at its periphery into which engages a pinion 20 mounted on a shaft 22 journalled in the telescope casing and parallel to the shaft 16. This shaft 22 carries a handle 21.

By turning the handle 21 the logarithmic division of the scale 19 is adjusted to the known height of the air craft above the auxiliary target, this height being indicated by the pointer 23. Then by turning the handle 17 the image of the auxiliary target appearing in the eye piece is adjusted, so as to exactly coincide with the air bubble in the focus water level 7, whereupon the horizontal distances $F_1Z$ and $F_2Z$ of the auxiliary target at the beginning and at the end respectively of the measuring period of 100 seconds may be directly read on the logarithmic division on scale 19 by means of the pointer 18 fast on the handle 17. The division on scale 19 is as stated, a logarithmic one on which linear heights are indicated by the pointer 23 and horizontal distances by the pointer 18. At the same time the horizontal angles $\alpha_1$ and $\alpha_2$ of the auxiliary target at the beginning and at the end of the measuring period relatively to the longitudinal axis of the air craft are found by reading on the scale $2a$ by means of the pointer $1a$, whereby all of the four quantities are determined to which the double triangle solving device, shown in Fig. 3, must be adjusted.

The apparatus shown in Figs. 3 to 5 may also be used for determining the angle of allowance for the movement of the target proper, when missiles of any kind have to be launched from the aircraft against the said target, for instance a ship moving in a straight line with constant speed, the speed of the aircraft and of the missile being known.

For this purpose in the first place the speed $u$ of the ship and the direction $\sigma$ of the movement of the aircraft relative to the direction of movement of the ship must be determined, the ship moving in the measuring period through the distance $Z_1Z_2=uT$. Hence in accordance with the geometrical method illustrated in Fig. 2 and by means of the sighting apparatus shown in Figs. 4 and 5, the horizontal distances $F_1Z_1$ and $F_2Z_2$, and the angles $\alpha_1$ and $\alpha_2$ of the target proper, are measured at the beginning and at the end of the measuring period, which is preferably 100 seconds. These measurements are effected in the manner hereinbefore described.

First these four data are used for adjusting the double triangle solving device in such manner that the rule 26 is adjusted relative to the rule 24, located in the direction of flight of the aircraft, at the angle $\alpha_1$ by means of the angle scale 25. The rule 26 is then clamped in position, the adjusting mark of the slide 27 being adjusted to the horizontal distance $F_1Z_1$ of the target proper. The rule 29 is then adjusted to the angle $\alpha_2-\alpha_1$ on the angle scale 28 and locked in the adjusted position; the mark of the slide 33 is adjusted to the horizontal distance $F_2Z_2$ of the target proper. If now the rule 24 is applied against this slide mark, the distance $F_1F_2$ read thereon is equal to the change of distance having taken place in the measuring period $T$. If now the mark of the slide 30 is adjusted to 100 times the speed of the aircraft and the rule 32 is also placed on the point $F_2$ indicated by the mark of the slide 33, the angle $\sigma$ of the direction of movement of the ship relative to the axis of the aircraft can be read on the angle scale 31 while on the rule 32 the speed $c$ of the ship multiplied by 100 can be read.

But thereby also the most advantageous angle of allowance $\tau$ (Fig. 2) for the movement of the ship is determined, which angle is required for the missile to hit the ship, since for a given speed $w$ of the missile it is found $$\tan \tau = \frac{u}{w}.$$

If therefore a rule 35, Fig. 5 is secured to the base plate 1 of the optical sighting apparatus, and provided with a speed scale, and is placed in the direction of the axis of the aircraft, and if on this rule 35 a slide 36 is mounted which carries a mark $E$ and a horizontal arm 37, perpendicular to the rule 35 and provided with a speed scale, and if furthermore on the said arm 37 a slide 38 is mounted which is provided with a mark $E_1$ and which can be clamped in position by a set screw 40; then the optical sighting apparatus may be adjusted at once to the angle $\tau$ by bringing the edge of the arm 39 on the horizontally rotatable casing 2 onto the point of the arm 37 indicated by the mark $E_1$, the said edge being in the vertical sighting plane and passing through the axis $\chi$ of rotation of the casing 2, this adjustment occurring after the slide 36 on the rule 35 has been adjusted to the speed $w$ of the missile or torpedo and the slide 38 on the arm 37 has been adjusted to the speed $u$ and both slides have been locked in position. 40 is a set screw for locking in position the slide 38 on the rule 37. The arm 39 is fast on the casing 2 and is held in position by a set screw $1b$ screwed into the casing 1. Prior to a fresh sighting of the target proper by the sighting apparatus adjusted to the angle $\tau$ of allowance relatively to the axis of the aircraft, the direction of flight of the aircraft must be changed by the angle $90°-\sigma$ (shown in Fig. 2) in order to launch the missile or torpedo at the moment when the target proper appears at $Z_3$, in order to hit the same at $Z_4$. As will be understood, the rule 34 might be dispensed with, when the apparatus is used only for determining the angle $\tau$ of allowance for launching missiles.

In order that the operation of the device shown in Figs. 4 and 5, in conformance with the geometrical showing in Fig. 2, may be more readily understood, the following explanation is submitted at this time. It has to be borne in mind that the operation of the device takes place in the presence of a full calm, that is, that there is no wind. In Fig. 1 it is assumed that the target is stationary, but that there is wind, but, of course the same figure applies when the target has a movement of its own, but there is no wind; the relative movements of the target and the aircraft being the same in both cases. If, however, the target moves and there is wind, the problem cannot be solved by the method illustrated in Fig. 2.

At the beginning of the measuring time, which has been referred to previously as being usually one hundred seconds, the aircraft will be at a certain definite height, determined by the altimeter or other suitable instruments, above the point $-F_1-$, shown in Fig. 2. The angle $\alpha$, between the axis of the aircraft, represented in Fig. 2 by the line $F_1F_2$, and the line $Z_1F_1$, representing the horizontal distance between the aircraft and the target at the time of beginning of measurements, can likewise be determined in the manner previously discussed with reference to Fig. 1.

Now at the end of the measuring time of one hundred seconds, the aircraft is at the same height above the point $-F_2-$, the ship having moved in the meantime to the position $-Z_2-$ so that the horizontal distance between the target and the aircraft is represented by $-F_2Z_2-$, and the angle $\alpha_2$ between the axis of the aircraft and the line $F_2Z_2$ can likewise be determined in the manner indicated above with reference to Fig. 4.

If now, with the data obtained in the foregoing manner, the two parallelograms $F_1F'_1Z_2Z_1$ and $F_1F'_1AF_2$ are drawn as shown in Fig. 2, it will be readily seen that $Z_1Z_2$ (the distance through which the target has travelled during the period of observation) is equal to $F_1F'_1$, and therefore, is in turn equal to $F_2A$. As stated just above, the distances thus measured are equal to the distance through which the target, in the present instance a ship, has moved during the measured time T, so that the actual distance traversed equals one hundred times the speed of the vessel.

This distance $Z_1Z_2=F_2A$ can be mechanically determined by the use of the double triangle solving device shown in Fig. 3, on which is set up the data corresponding to the irregular line $F'_1Z_2F_2F'_1AF_2$. To carry out the desired calculations, the slide 30 on the rule 24 is first so adjusted that on the rule there may be read the distance $vT$, equal to one hundred times the specified speed of the aircraft. Thereafter the rule 26 is turned about an angle $\alpha_1$ relative to the rule 24, at which time the slide 27 of the rule 26 is adjusted to indicate thereon the distance of the target from the ship $F_1Z_1=F'_1Z_2$. At this time the rule 29 is turned about the rule 26 so that between the two rules 26 and 29 an angle $\alpha_2$ minus $\alpha_1$ is enclosed. Thereafter the slide 33 on the rule 29 is adjusted to indicate the distance of the target from the aircraft $F_2Z_2$ at the termination of the time interval of measurements. The rule 32 is then rocked about its pivot point until its measuring edge comes adjacent the pointer mark of the slide 33, so that there now may be directly read on the rule 32 the distance through which the ship has travelled during the measuring time, that is, a hundred times the speed —$u$— of the ship. In other words, on the scale 32 may be read the distance $Z_1Z_2$. The angle $\sigma$ which may be read on the circular scale 31 between the rules 24 and 32 is that angle, which has a complementary angle with respect to 90°, through which complementary angle the course of the aircraft must be shifted in order that such course will cross the direction of travel of the target at right angles.

After determining the speed of the target, the slide 38 on the rule 37 as shown in Fig. 5, is correspondingly adjusted. This adjustment takes place, however, only after the rule 37 has been fixed in such manner with respect to rule 35 as to indicate thereon the predetermined speed of the projectile to be launched from the aircraft. Now, assuming the aircraft to reach a point $F_3$ as shown in Fig. 2, its course having been altered through the angle 90 —$\epsilon$—, then when the vessel or target has in the meantime reached a position $Z_3$ such that the target is visible in the angle $\tau$ of allowance of movement in the elongation of the sighting edge of the rule 39, then the projectile is released, and strikes the target at the position $Z_4$. The rule 34 which is adjusted so that its edge coincides at a certain point with that point at which the rules 29 and 32 cross, indicates on its scale the relative speed of the target as compared to that of the aircraft, i. e. the vectorial difference of the speeds while the angle K between the rules 24 and 34, as measured on the angle scale 25, indicates the angle of actual direction of travel or the longitudinal axis of the aircraft as compared to the apparent direction of the movement of the target $F_2F'_1$ there being no wind as assumed. It is obvious that once my invention has been disclosed, numerous modifications and adaptations will readily occur to those skilled in the art. Accordingly, it is intended that the invention be limited only by the scope of the appended claim.

What I claim is:

In an apparatus for determining the speed and direction of movement of aircrafts and targets, an optical sighting device mounted in the aircraft and comprising means for determining the horizontal distances and the horizontal angles of a target below the level of the said aircraft at the beginning and at the end of a predetermined measuring period, the said optical sighting apparatus being adapted to rotate around a vertical axis and comprising a casing, an entering reflector, means for turning said entering reflector around a horizontal axis, a cam journalled in the said casing, means for turning the said cam at double the speed of the entering reflector, a second cam journalled in the said casing, means for actuating the second mentioned cam by the first mentioned cam, whereby when the first mentioned cam is turned through an angle $\phi$, the second mentioned cam is turned through an angle representing the log tan $\phi$, a pointer, means for transmitting the rotary movement of the second mentioned cam to the said pointer, a scale for the said pointer, means for adjusting the said scale to the logarithm of any given value of $h$, the height of the aircraft above the target, whereby the said pointer shows directly on the scale the sum log $h +$log tan $\phi=$log ($h$ tan $\phi$), a circular angle scale concentric with and fast on the said casing, and a stationary pointer, the quantities thus determined serving for the adjustment of a so-called double triangle solving device for mechanically determining the said directions and speeds.

ANTONIO CLEMENTI